US012596404B2

(12) United States Patent
Zheng et al.

(10) Patent No.: US 12,596,404 B2
(45) Date of Patent: Apr. 7, 2026

(54) FLEXIBLE DISPLAY MODULE AND DISPLAY DEVICE

(71) Applicant: Hefei Visionox Technology Co., Ltd., Hefei (CN)

(72) Inventors: Cai Zheng, Hefei (CN); Hongjun Xie, Hefei (CN); Liwei Ding, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 175 days.

(21) Appl. No.: 18/362,042

(22) Filed: Jul. 31, 2023

(65) Prior Publication Data

US 2023/0400885 A1      Dec. 14, 2023

Related U.S. Application Data

(63) Continuation of application No. PCT/CN2022/113503, filed on Aug. 19, 2022.

(30) Foreign Application Priority Data

Dec. 30, 2021    (CN) .......................... 202111655833.8

(51) Int. Cl.
*G06F 1/16*        (2006.01)
(52) U.S. Cl.
CPC ................................. *G06F 1/1652* (2013.01)
(58) Field of Classification Search
CPC .. G06F 1/1652; G09F 9/301; G02F 1/133305; H10K 2102/311; H04M 1/0268
See application file for complete search history.

(56) References Cited

U.S. PATENT DOCUMENTS

| | | | | |
|---|---|---|---|---|
| 9,829,922 B2 * | 11/2017 | Hong | .................... | G06F 1/1652 |
| 10,175,792 B2 * | 1/2019 | Kim | ........................ | G09F 11/30 |
| 11,369,029 B2 * | 6/2022 | Luo | ..................... | H05K 5/0217 |
| 11,842,659 B2 * | 12/2023 | Khachatryan | ......... | G06F 1/1652 |

(Continued)

FOREIGN PATENT DOCUMENTS

| | | |
|---|---|---|
| CN | 104020594 A | 9/2014 |
| CN | 106787516 A | 5/2017 |

(Continued)

OTHER PUBLICATIONS

International Search Report and Written Opinion issued on Oct. 26, 2022, in corresponding International Patent Application No. PCT/CN2022/113503, 15 pages.

(Continued)

*Primary Examiner* — Rockshana D Chowdhury
(74) *Attorney, Agent, or Firm* — Maier & Maier, PLLC

(57)        ABSTRACT

A flexible display module and a display device relate to the field of display, and used for displaying an image. A problem that a flexible display panel is prone to producing cracks or film layers in the flexible display panel are separated from each other when a reel rolls up the flexible display module is solved. The flexible display module includes the reel and the flexible display panel, the reel is magnetic, and the flexible display panel can be rolled up onto the reel; and the flexible display panel includes a magnetic attraction part, which is configured to be attracted by the reel when the flexible display panel is rolled up onto the reel, so that the flexible display panel fits with the reel.

19 Claims, 11 Drawing Sheets

A

(56) References Cited

U.S. PATENT DOCUMENTS

| | | | |
|---|---|---|---|
| 11,862,048 B2 * | 1/2024 | Li | G09F 9/301 |
| 11,864,333 B2 * | 1/2024 | Dong | G06F 1/1652 |
| 11,940,849 B2 * | 3/2024 | Choi | G06F 1/1652 |
| 11,985,775 B2 * | 5/2024 | Wang | G06F 1/1652 |
| 11,991,844 B2 * | 5/2024 | Li | H05K 5/0217 |
| 12,022,628 B2 * | 6/2024 | Wang | G09F 9/33 |
| 12,277,010 B2 * | 4/2025 | Wang | G06F 1/1681 |
| 2011/0227855 A1 * | 9/2011 | Kim | G06F 3/04886 |
| | | | 345/173 |
| 2011/0316658 A1 * | 12/2011 | Liu | H05K 1/165 |
| | | | 336/200 |
| 2015/0340004 A1 * | 11/2015 | Pang | G06F 1/1652 |
| | | | 345/205 |
| 2016/0231843 A1 * | 8/2016 | Kim | G06F 1/1652 |
| 2017/0278436 A1 * | 9/2017 | Chu | G09F 9/301 |
| 2017/0364122 A1 * | 12/2017 | Kim | G09F 9/301 |
| 2018/0375054 A1 * | 12/2018 | Wang | H10K 77/111 |
| 2021/0204433 A1 | 7/2021 | Luo et al. | |
| 2021/0242420 A1 | 8/2021 | Luo et al. | |
| 2021/0272486 A1 * | 9/2021 | Khachatryan | G09F 9/301 |
| 2021/0366638 A1 * | 11/2021 | Dong | H01F 7/066 |
| 2022/0100234 A1 * | 3/2022 | Kishimoto | G06F 3/0446 |
| 2022/0158331 A1 * | 5/2022 | Jeon | H01Q 1/38 |
| 2022/0269312 A1 * | 8/2022 | Choi | G06F 1/1652 |
| 2022/0317732 A1 * | 10/2022 | Lee | G06F 1/1643 |
| 2022/0386485 A1 * | 12/2022 | Dong | G06F 1/1652 |
| 2023/0345655 A1 * | 10/2023 | Sano | G06F 1/1624 |

FOREIGN PATENT DOCUMENTS

| | | | |
|---|---|---|---|
| CN | 109493737 A | 3/2019 |
| CN | 110024157 A | 7/2019 |
| CN | 110211501 A | 9/2019 |
| CN | 110942719 A | 3/2020 |
| CN | 111063261 A | 4/2020 |
| CN | 111862825 A | 10/2020 |
| CN | 112150930 A | 12/2020 |
| CN | 112185257 A | 1/2021 |
| CN | 112596580 A | 4/2021 |
| CN | 112634753 A | 4/2021 |
| CN | 114241921 A | 3/2022 |
| JP | 2003501705 A | 1/2003 |
| KR | 1020140127620 A | 11/2014 |
| WO | 2018186631 A1 | 10/2018 |

OTHER PUBLICATIONS

Office Action issued on Apr. 25, 2023, in corresponding Chinese Patent Application No. 202111655833.8, 11 pages (partial English provided).

Office Action issued on Oct. 16, 2023, in corresponding Chinese Application No. 202111655833.8, 7 pages.

Office Action issued on Feb. 10, 2026, in corresponding Korean Application No. 10-2023-7026160, 12 pages.

* cited by examiner

B-B

B-B

A

A

A

FLEXIBLE DISPLAY MODULE AND DISPLAY DEVICE

CROSS-REFERENCE TO RELATED APPLICATION

The present application is a continuation of International Application No. PCT/CN2022/113503, filed on Aug. 19, 2022, which claims priority to Chinese Patent Application No. 202111655833.8, filed with China National Intellectual Property Administration on Dec. 30, 2021, entitled "Flexible Display Module and Flexible Display Device". The aforementioned patent applications are hereby incorporated by reference in their entireties.

TECHNICAL FIELD

Embodiments of the present application relate to the technical field of display, in particular to a flexible display module and a flexible display device.

BACKGROUND

With continuous development of display technology, people put forward higher requirements for the flexible display module, requiring the size of the display screen of the flexible display module to be adjustable. The flexible display module usually includes a reel and a flexible display panel, one end of the flexible display panel is connected with the reel, and the flexible display panel is rolled up or unfolded when the reel is rotated, so that the display screen of the flexible display panel can be adjusted.

However, the flexible display panel is prone to producing cracks or the film layers in the flexible display panel are separated from each other when the flexible display panel is rolled up by the reel, thereby affecting the display effect of the flexible display module.

SUMMARY

In view of the above problem, embodiment of the present application provides a flexible display module to solve the technical problem that the flexible display panel is prone to producing cracks or the film layers in the flexible display panel are separated from each other when the reel rolls up the flexible display module.

In order to achieve the above object, the embodiments of the present application provide the following technical solutions.

A first aspect of the embodiments of the present application provides a flexible display module, including a reel and a flexible display panel, where the reel is magnetic, and the flexible display panel can be rolled up onto the reel; the flexible display panel includes a magnetic attraction part, which is configured to be attracted by the reel when the flexible display panel is rolled up onto the reel.

In the flexible display module provided by the embodiments of the present application, since the flexible display panel includes a magnetic attraction part, when the flexible display panel is rolled up onto the reel that is magnetic, the magnetic attraction part is attracted by the reel, so that the flexible display panel can fit with the reel in a process of rolling up, reducing a spacing between each two adjacent circles of flexible display panels, which enables each circle of flexible display panel to be supported In this way, a stress concentration due to sudden change in shape of each circle of flexible display panel can be avoided, preventing the flexible display panel from cracking and inner film layers of the flexible display panel from separation, and thus ensuring a display effect of the flexible display module.

At the same time, as the flexible display panel can fit with the reel in the process of rolling up, the spacing between each two adjacent circles of flexible display panels is reduced, thereby reducing a space occupied by the flexible display panel rolled up onto the reel, and improving utilization rate of space of the flexible display module.

A second aspect of the embodiments of the present application provides a flexible display device, including any one of the flexible display modules described above.

The flexible display device of the embodiments of the present application embodiment also has the advantages of the flexible display module above as it includes the flexible display module, which will not be repeated here.

DETAILED DESCRIPTION OF EMBODIMENTS

In a flexible display module, a flexible display panel has a technical problem of being prone to producing cracks or separation of film layers from each other in the flexible display panel when the flexible display panel is rolled up onto a reel. The inventor found through researches that the reason for this problem is that when the flexible display panel is rolled up onto the reel, there is a spacing between each two adjacent circles of flexible display panels, and each circle of flexible display panel has no support, which makes each circle of flexible display panel prone to appear sudden change in shape and generate stress concentration at a position of sudden change in shape, resulting in cracks or separation of the film layers from each other in the flexible display panel, thereby affecting the display effect of the flexible display module.

In view of the above technical problem, an embodiment of the present application provides a flexible display module where the reel is set to be magnetic, and a magnetic attraction part is arranged in the flexible display panel, and the magnetic attraction part is attracted by the reel when the flexible display panel is rolled up onto the reel, so that the flexible display panel can fit with the reel in a process of being rolled up, reducing the spacing between each two adjacent circles of flexible display panels, resulting in that each circle of flexible display panel has support. In this way, the stress concentration due to sudden change in shape of each circle of flexible display panel can be avoided, preventing the flexible display panel producing cracks and inner film layers of the flexible display panel from separation, and thereby ensuring the display effect of the flexible display module.

Figure 1:
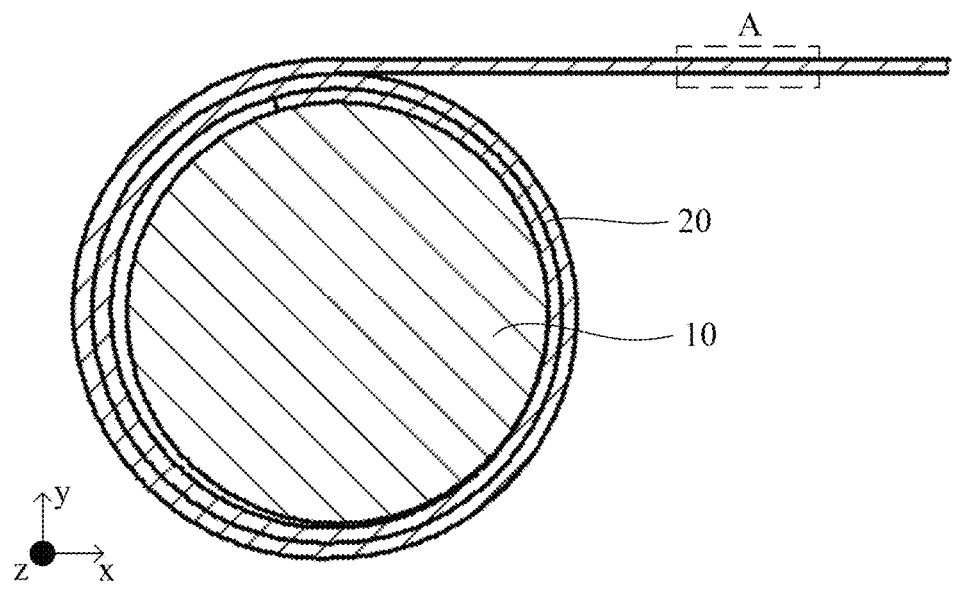
FIG. 1 is a schematic diagram of a cross-sectional structure of a flexible display module according to an embodiment of the present application.

In order to make the above object, features and advantages of the embodiments of the present application more obvious and easy to be understood, the technical solutions in the embodiments of the present application will be described clearly and completely in combination with the accompanying drawings in the embodiments of the present application. Referring to FIG. 1, an embodiment of the present application provides a flexible display module including a reel 10 and a flexible display panel 20 that can be rolled up onto the reel 10. Exemplarily, one end of the flexible display panel 20 may be connected to an outer circumference of an electromagnetic reel 10. Part of the flexible display panel 20 is rolled up onto the electromagnetic reel 10, and the rest of the flexible display panel 20 is in an unfolded state.

When the reel 10 rotates forward, for example, when it rotates counterclockwise as shown in FIG. 1, the flexible display panel 20 is further rolled up onto the reel 10, increasing an area of the part of the flexible display panel 20 rolled up onto the reel 10 and reducing an area of the part of the flexible display panel 20 in the unfolded state. When the reel 10 rotates backward, for example, when the reel 10 rotates clockwise as shown in FIG. 1, the part of the flexible display panel 20 rolled up onto the reel 10 is gradually unfolded, reducing the area of the part of the flexible display panel 20 rolled up onto the reel 10 and increasing the area of the part of the flexible display panel 20 in the unfolded state.

Accordingly, the area of the part of the flexible display panel 20 rolled up onto the reel 10 can be adjusted by controlling a rotation direction of the reel 10, thereby adjusting the area of the part of the flexible display panel 20 in the unfolded state, so as to realize the adjustment of size of a display screen of the flexible display module.

The reel 10 is used for rolling up the flexible display panel 20, and the reel 10 is magnetic. Exemplarily, a material of the reel 10 may include materials with permanent magnetism, such as Al—Ni—Co-based permanent magnet alloys, Fe—Cr—Co-based permanent magnet alloys, permanent magnet ferrites and the like. Exemplarily, the reel 10 may also be an electromagnetic reel, the electromagnetic reel is magnetic when energized and is not magnetic when not energized. When the flexible display panel 20 is rolled up onto the electromagnetic reel, the electromagnetic reel is energized and magnetic, so as to provide a magnetic attraction force for the flexible display panel 20, so that the flexible display panel 20 is adsorbed onto the electromagnetic reel; when the flexible display panel 20 is unfolded, the electromagnetic reel is not energized and not magnetic, and the flexible display panel 20 does not have a magnetic attraction force, so that the flexible display panel 20 can be unfolded.

Figure 2:
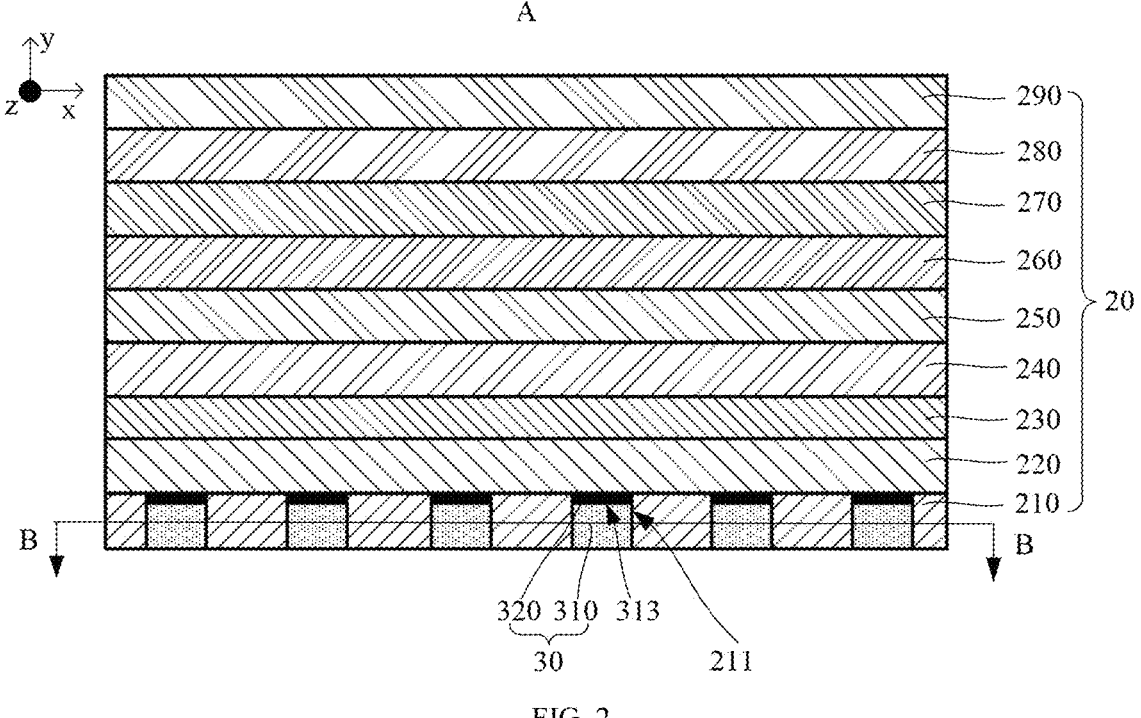
FIG. 2 is a schematic diagram of a cross-sectional structure at A of the flexible display panel shown in FIG. 1.

The flexible display panel 20 is used for displaying an image and has a flexible and bendable property and thus can be rolled up onto the reel 10. Referring to FIG. 2, the flexible display panel 20 may include a magnetic attraction part 30, the magnetic attraction part 30 is configured to be attracted by the reel 10 when the flexible display panel 20 is rolled up onto the reel 10, so that the flexible display panel 20 fits with the reel 10, thereby reducing the spacing between each two adjacent circles of flexible display panels 20, enabling each circle of flexible display panel 20 to have support. In this way, the stress concentration caused by sudden change in shape of each circle of flexible display panel can be avoided, preventing the flexible display panel 20 producing cracks and the inner film layers of the flexible display panel 20 from separation, and thus ensuring the display effect of the flexible display module.

At the same time, since the flexible display panel 20 can fit with the reel 10 in the process of being rolled up, reducing the spacing between each two adjacent circles of flexible display panels 20, thereby reducing the space occupied by the flexible display panel 20 rolled up onto the reel 10 and improving the utilization of space of the flexible display module.

Exemplarily, referring to FIG. 2, the flexible display panel 20 may include a first support layer 210, a second support layer 220, a substrate 230, an array film layer 240, a display film layer 250 and a packaging film layer 260 in a laminated arrangement.

The first support layer 210 is arranged on one side of the second support layer 220 facing away from the substrate 230. The first support layer 210 has a supporting effect on the second support layer 220 and the substrate 230, as well as other film layers above the substrate 230. Exemplarily, the first support layer 210 may be a sheet structure, and a material of the first support layer 210 may be stainless steel, titanium, or the like. The first support layer 210 has an ability of bending and does not affect bendable performance of the flexible display panel 20; meanwhile, the first support layer 210 additionally has high strength and stiffness to ensure the support and protection on other film layers of the flexible display panel 20.

The second support layer 220 may be arranged on and in contact with the first support layer 210, and the second support layer 220 has a supporting effect on other film layers of the flexible display panel 20 located on the second support layer 220. Exemplarily, the second support layer 220 may be a support film for providing supporting effect and additionally has a buffering capacity for absorbing external shock and vibration on the flexible display panel 20, to prevent the flexible display panel 20 from damage and play a role of protecting the flexible display panel 20.

The substrate 230 may be arranged on one side of the second support layer 220 away from the first support layer 210 and is configured to support other films of the flexible display panel 20 located on the substrate 230. Exemplarily, the substrate 230 may be a flexible substrate, such as polyimide (PI). The array film layer 240 is arranged on the substrate 230 and is configured to drive the display film layer 250 to emit light. Exemplarily, a drive circuit may be provided within the array film layer 240. The display film layer 250 is arranged on the array film layer 240 and is configured to display the image. Exemplarily, the display film layer 250 internally has a plurality of pixel units arranged in a matrix, each pixel unit is connected to the drive circuit within the array film layer 240, and the drive circuit can drive each pixel unit to emit light, thereby displaying the image. The packaging film layer 260 is arranged on the display film layer 250 to package the display film layer 250 so as to prevent for example water and oxygen from invading into the display film layer 250 and thus causing the failure of the display film layer 250.

Exemplarily, referring to FIG. 2, the flexible display panel 20 may further include a touch layer 270 and a cover layer 290 laminated on the packaging film layer 260. The touch layer 270 is used to control the function of the flexible display module. The cover layer 290 may be arranged above the touch layer 270 and is configured to protect the touch layer 270 and film layers below the touch layer 270.

The flexible display panel 20 further includes a polarizing layer 280 located between the packaging film layer 260 and the cover layer 290. Exemplarily, referring to FIG. 2, the polarizing layer 280 may be located between the touch layer 270 and the cover layer 290. In other embodiments, the polarizing layer 280 may be located between the packaging film layer 260 and the touch layer 270. The polarizing layer 280 is used to eliminate ambient light reflected by an electrode layer in the flexible display panel 20, thereby improving the display effect of the flexible display panel 20.

A magnetic attraction part 30 is arranged in the flexible display panel 20. Exemplarily, referring to FIG. 2, the magnetic attraction part 30 may include a fixing adhesive layer 310 and a magnetic powder 320, and the fixing adhesive layer 310 is arranged in the flexible display panel 220 to fix the magnetic powder 320. When the flexible display panel 20 is rolled up onto the reel 10 that is magnetic, the magnetic powder 320 in the magnetic attraction part 30 can be attracted to the reel 10 to enable the flexible display panel 20 to fit with the reel 10, reducing the spacing between each two adjacent circles of flexible display panels 20, so that each circle of flexible display panel 20 has support. In this way, the stress concentration caused by the sudden change of the shape of each circle of flexible display panel can be avoided, preventing the flexible display panel 20 from cracking and inner film layers of the flexible display panel 20 from separation, and ensuring the display effect of the flexible display module; at the same time, the space occupied by the flexible display panel 20 rolled up onto the reel 10 can be reduced, improving utilization of space of the flexible display module.

The magnetic powder 320 may be a powder of a magnetic material. Exemplarily, the magnetic powder 320 may be made of Fe, Co, Ni, Fe—Co—Ni alloy, or the like. Since the magnetic powder 320 is a powder and is easily deformed, it can not only be absorbed to the magnetic reel 10, but also does not affect the bending of the flexible display panel 20, facilitating the bending of the flexible display panel 20.

The fixing adhesive layer 310 of the magnetic attraction part 30 may be arranged in at least one film layer of the flexible display panel 20. Exemplarily, a receiving cavity may be arranged in the film layer, and the fixing adhesive layer 310 is located within the receiving cavity.

Exemplarily, the magnetic attraction part 30 may be arranged in at least one film layer located on one side of the array film layer 240 away from the display film layer 250. The receiving cavity may be a first receiving cavity or a second receiving cavity. For example, a first receiving cavity may be arranged in the film layer, and the fixing adhesive layer 310 is located within the first receiving cavity. Exemplarily, the fixing adhesive layer 310 may also be arranged in at least one film layer on one side of the substrate 230 away from the second support layer 220, a second receiving cavity may be provided in the film layer, the second receiving cavity is located within a non-display area, and the fixing adhesive layer 310 is located within the second receiving cavity.

The following is taking the fixing adhesive layer 310 located within the first support layer 210 as an example, to describe a solution in which the fixing adhesive layer 310 may be arranged in at least one film layer located on the side of the array film layer 240 away from the display film layer 250.

Figure 3:
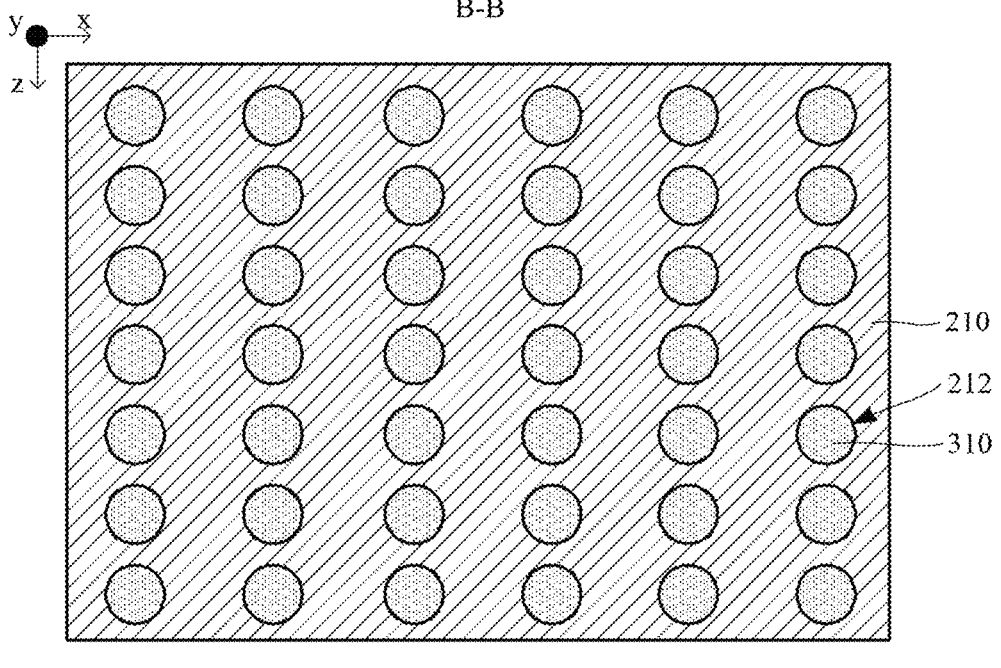
FIG. 3 is a schematic diagram of a cross-sectional structure taken along a B-B direction shown in FIG. 2.

Referring to FIG. 2, the first support layer 210 is provided with a first receiving cavity 211, and the magnetic powder 320 is located within the first receiving cavity 211. Exemplarily, referring to FIG. 3, the first receiving cavity 211 may be a first receiving hole 212, and the fixing adhesive layer 310 may be filled in the first receiving hole 212. There may be a plurality of first receiving holes 212, and the plurality of first receiving holes 212 are all arranged in the first support layer 210, the first receiving holes 212 are used to accommodate the fixing adhesive layer 310, and can also reduce the stress when the first support layer 210 is bent, thereby facilitating the bending of the first support layer 210, so that the flexible display panel 20 can be rolled up onto the reel 10. Exemplarily, the plurality of first receiving holes 212 may be arranged in a matrix on the first support layer 210, or the plurality of first receiving holes 212 may be randomly arranged on the first support layer 210. Shapes of cross sections of the first receiving holes 212 in a direction parallel to the first support layer 210 may be circular, rectangular, triangular, or the like.

Figure 4:
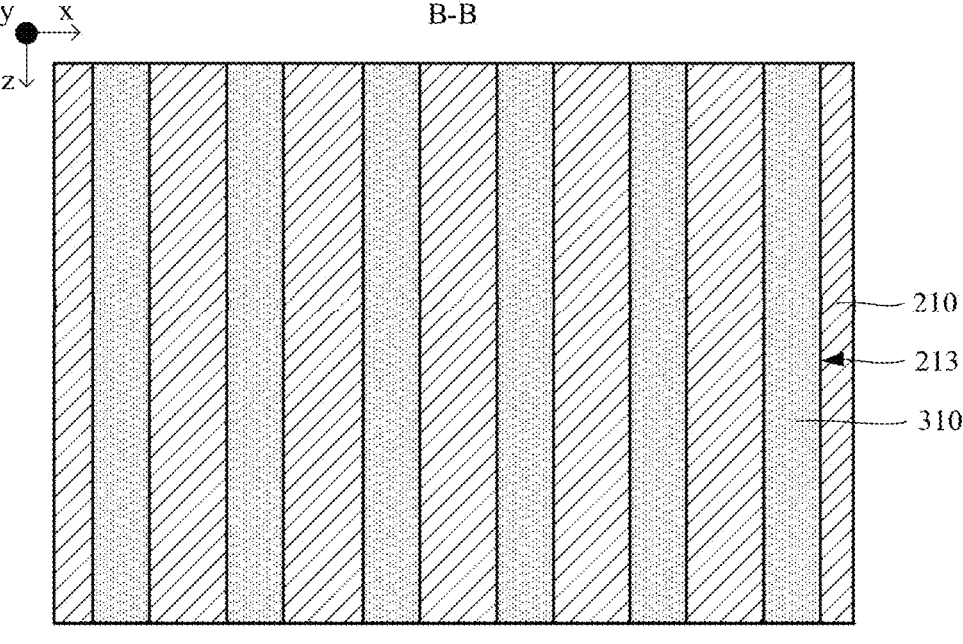
FIG. 4 is a schematic diagram of another cross-sectional structure taken along the B-B direction shown in FIG. 2.

Exemplarily, referring to FIG. 4, the first receiving cavity 211 may also be a first receiving groove 213, and the fixing adhesive layer 310 is filled in the first receiving groove 213. The first receiving groove 213 may extend along an axial direction of the reel 10, for example, the first receiving groove 213 may extend in z direction in FIG. 4. There may be a plurality of first receiving grooves 213, and the plurality of first receiving grooves 213 are arranged in parallel and spaced apart. The first receiving grooves 213 are used for accommodating the fixing adhesive layer 310, and can also reduce the stress when the first support layer 210 is bent, thereby facilitating the bending of the first support layer 210, so that the flexible display panel 20 can be rolled up onto the reel 10. At the same time, the first receiving grooves 213 also have a larger volume, which can increase a volume of the magnetic powder 320 that can be accommodated, thereby increasing an attraction force between the magnetic attraction part 30 and the reel 10, and thus further reducing the spacing between adjacent circles of flexible display panels 20.

Exemplarily, referring to FIG. 2, the fixing adhesive layer 310 may be provided with an accommodating cavity 313 and the magnetic powder 320 is located within the accommodating cavity 313. In some implementations of the embodiment of the present application, the fixing adhesive layer 310 may be filled in the first receiving cavity 211. Taking an orientation shown in FIG. 2 as an example, a top surface of the fixing adhesive layer 310 and a side wall of the first receiving cavity 211 enclose to form the accommodating cavity 313. The magnetic powder 320 is located on the top surface of the fixing adhesive layer 310, and a top surface of the magnetic powder 320 is not higher than the top surface of the first support layer 210.

Figure 5:
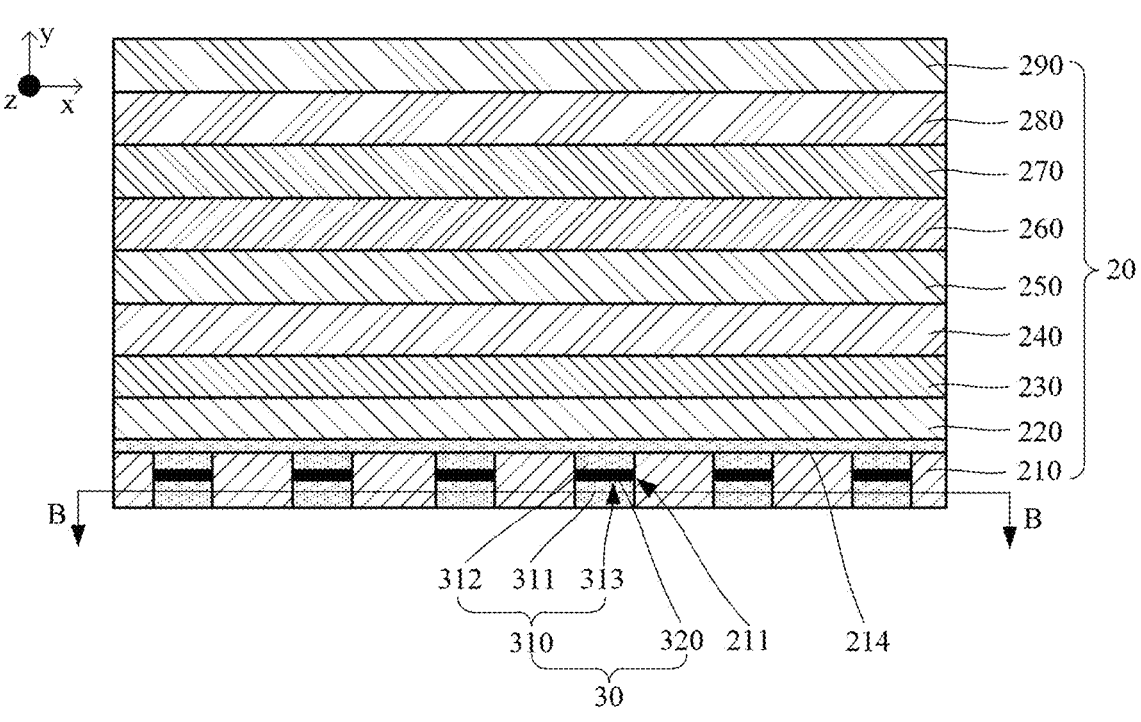
FIG. 5 is a schematic diagram of another cross-sectional structure at A of the flexible display panel shown in FIG. 1.

In some other implementations of the embodiments of the present application, referring to FIG. 5, the fixing adhesive layer 310 may include a first adhesive layer 311 and a second adhesive layer 312 arranged opposite to each other, and an accommodating cavity 313 is formed between the first adhesive layer 311 and the second adhesive layer 312. Exemplarily, the first adhesive layer 311 is filled in the first receiving cavity 211. Taking an orientation shown in FIG. 5 as an example, the second adhesive layer 312 is located above the first adhesive layer 311 and is filled in the first receiving cavity 211. There is a spacing between a bottom surface of the second adhesive layer 312 and a top surface of the first adhesive layer 311, the spacing and a side wall of the first receiving cavity 211 enclose to form the accommodating cavity 313, and the magnetic powder 320 is located within the accommodating cavity 313. For example, the first adhesive layer 311 and the second adhesive layer 312 may be an optical adhesive or a pressure-sensitive adhesive or the like.

The present application further provides an embodiment, which is different from other embodiments in that there may be a connecting adhesive layer between the magnetic attraction part 30 and a film layer connected with the magnetic attraction part 30 so as to bond the film layer provided with the magnetic attraction part 30 to a film layer adjacent thereto. Exemplarily, referring to FIG. 5, the magnetic attraction part 30 is arranged in the first support layer 210, the second support layer 220 is adjacent to the first support layer 210, and there is a connecting adhesive layer between the second support layer 220 and the first support layer 210. The connecting adhesive layer includes a first connecting adhesive layer 214, and the fixing adhesive layer 310 and the first connecting adhesive layer 214 may be an integrated structure. The first connecting adhesive layer 214 is used for connecting the first supporting layer 210 and the second supporting layer 220. Since the first connecting adhesive layer 214 and the second adhesive layer 312 are an integrated structure, when the first connecting adhesive layer 214 is formed, a fixing adhesive layer 310, for example, the second adhesive layer 312 of the fixing adhesive layer 310, can be formed at the same time, thereby reducing process steps of the flexible display panel 20 and improving production efficiency of the flexible display panel 20.

Exemplarily, when the magnetic attraction part 30 is arranged on the second support layer 220, the first support layer 210 is adjacent to the second support layer 220, and there is a first connecting adhesive layer 214 between the first support layer 210 and the second support layer 220, and the fixing adhesive layer 310 and the first connecting adhesive layer 214 are an integrated structure. When the first connecting adhesive layer 214 is formed, the fixing adhesive layer 310, such as the first adhesive layer 311 of the fixing adhesive layer 310, can be formed at the same time, which can reduce the process steps of the flexible display panel 20 and improve the production efficiency of the flexible display panel 20.

Figure 6:
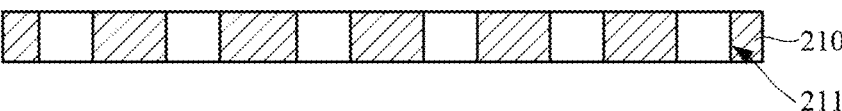
FIG. 6 is a schematic diagram of a first support layer, which has a first receiving cavity, of the flexible display panel shown in FIG. 5.
Figure 7:
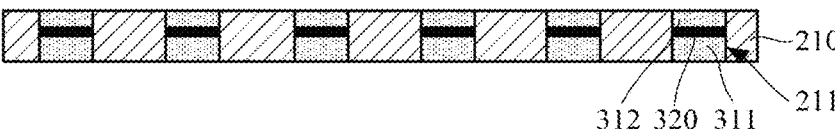
FIG. 7 is a schematic diagram of the first receiving cavity shown in FIG. 6 formed with a magnetic attraction part.
Figure 8:
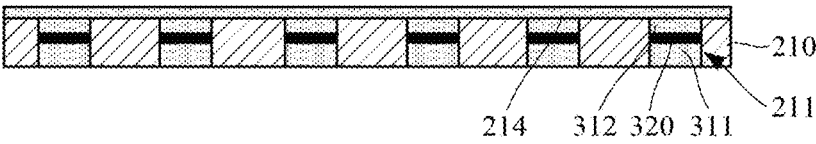
FIG. 8 is a schematic diagram of a first connecting adhesive layer formed on the first support layer shown in FIG. 7.
Figure 9:
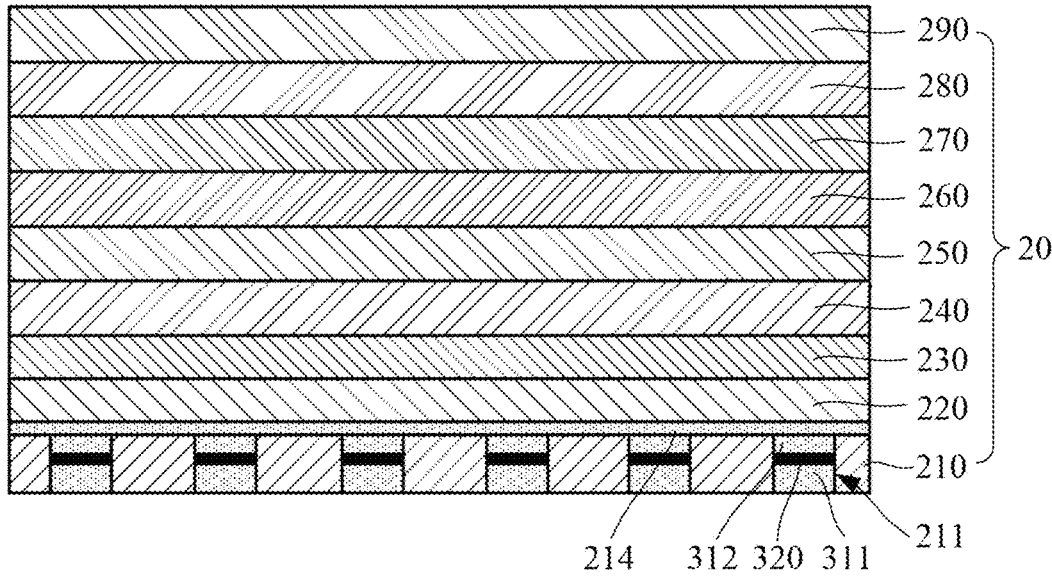
FIG. 9 is a schematic diagram of formation of other film layers of a flexible display panel on the first connecting adhesive layer shown in FIG. 8.

When the fixing adhesive layer 310 is arranged in the first receiving cavity 211 of the first support layer 210, referring to FIG. 6, the first support layer 210 may be provided first, and the first receiving cavity 211 may be formed on the first support layer 210. Then, referring to FIG. 7, the first adhesive layer 311, the magnetic powder 320 and the second adhesive layer 312 are sequentially filled in the first receiving cavity 211, and the top surface of the second adhesive layer 312 may not be higher than the top surface of the first receiving cavity 211. Subsequently, referring to FIG. 8, the first connecting adhesive layer 214 is formed on the top surface of the first support layer 210. Exemplarily, when the first connecting adhesive layer 214 is formed, part of the first connecting adhesive layer 214 may also be filled in the first receiving cavity 211 and cover the top surface of the magnetic powder 320 to form the second adhesive layer 312. The second adhesive layer 312 and the first connecting adhesive layer 214 may be an integrated structure, that is, the second adhesive layer 312 and the first connecting adhesive layer 214 can be formed simultaneously. Referring to FIG. 9, other film layers of the flexible display panel 20 are then sequentially formed on the first connecting adhesive layer 214.

Figure 10:
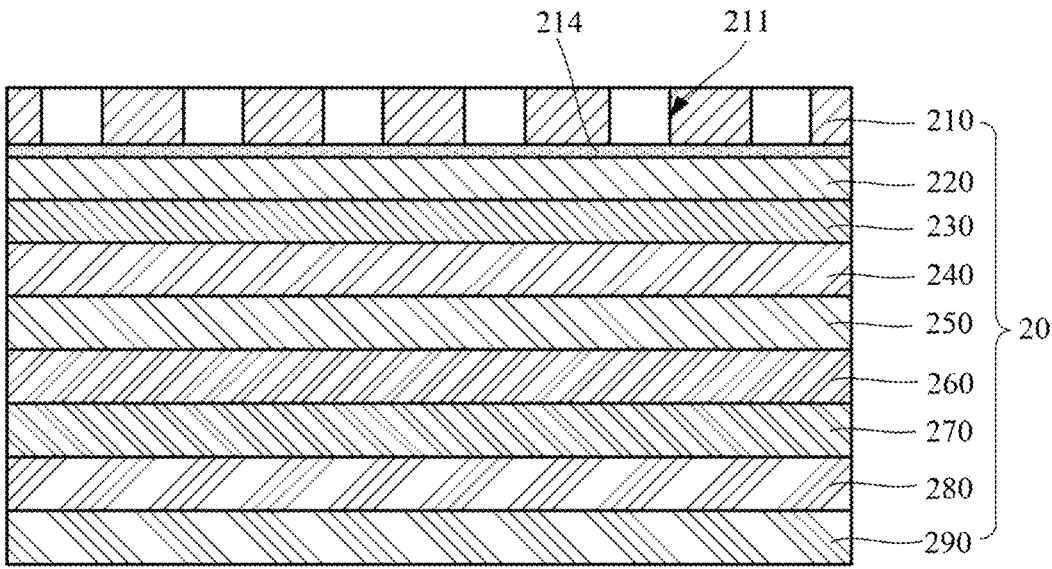
FIG. 10 is a schematic diagram of film layers of the flexible display panel shown in FIG. 5.
Figure 11:
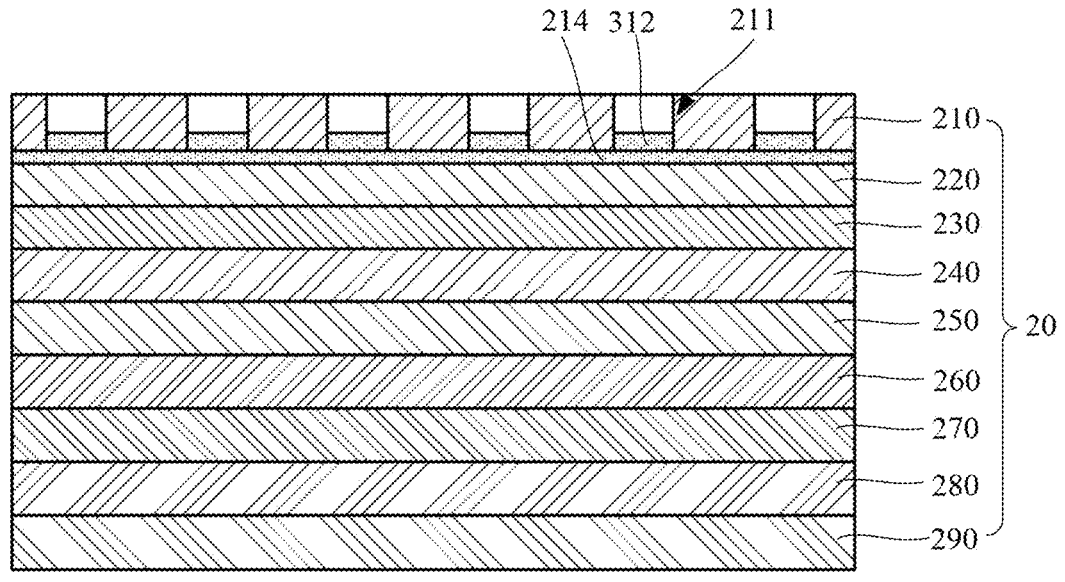
FIG. 11 is a schematic diagram of the first receiving cavity shown in FIG. 10 filled with a first adhesive layer.
Figure 12:
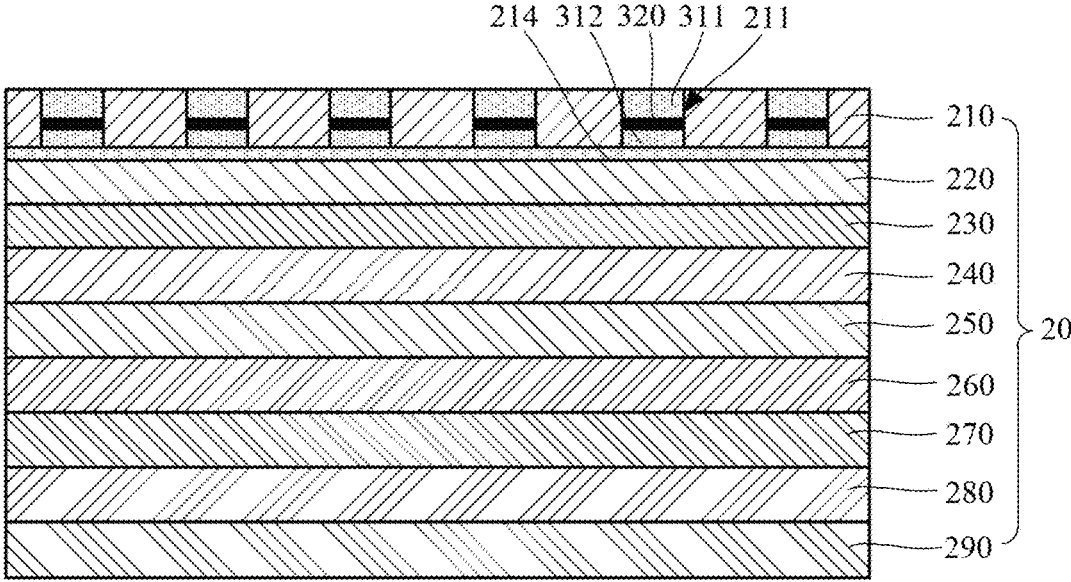
FIG. 12 is a schematic diagram of the first receiving cavity shown in FIG. 11 filled with a magnetic powder and a second adhesive layer.

In other embodiments, the fixing adhesive layer 310 is filled in the first receiving cavity 211 of the first support layer 210 after forming other film layers of the flexible display panel 20. Exemplarily, referring to FIG. 10, the flexible display panel 20 may be provided first, and the first receiving cavity 211 is formed on the first support layer 210 of the flexible display panel 20. Referring to FIG. 11, the second adhesive layer 312 is then formed in the first receiving cavity 211, and exemplarily, the second adhesive layer 312 may also be formed integrally with the first connecting adhesive layer 214 between the first support layer 210 and the second support layer 220. Referring to FIG. 12, the magnetic powder 320 and the first adhesive layer 311 are sequentially formed on the second adhesive layer 312, and both the magnetic powder 320 and the first adhesive layer 311 are located within the first receiving cavity 211. Taking an orientation shown in FIG. 11 as an example, the top surface of the first adhesive layer 311 may not be higher than the top surface of the first support layer 210.

Figure 13:
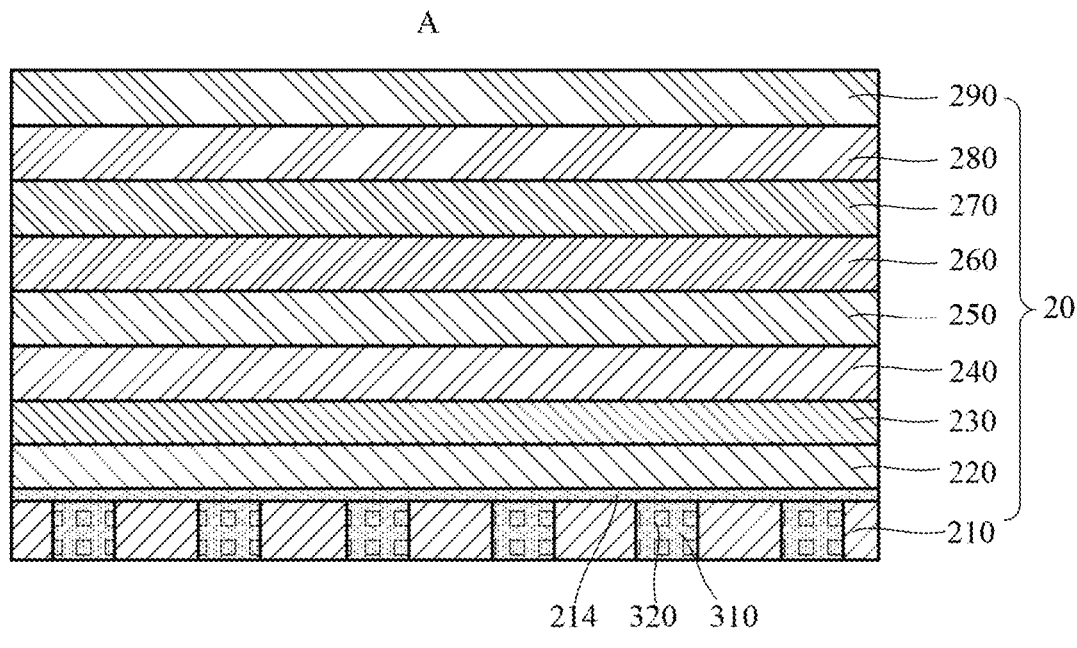
FIG. 13 is a schematic diagram of another cross-sectional structure at A of the flexible display panel shown in FIG. 1.

Exemplarily, referring to FIG. 13, the magnetic powder 320 can also be mixed in the fixing adhesive layer 310, and the fixing adhesive layer 310 mixed with the magnetic powder 320 can be filled in the first receiving cavity 211, thereby reducing the process steps of forming the magnetic attraction part 30 and improving the production efficiency.

It can be understood that the solution in which the fixing adhesive layer 310 is provided within the other film layer in film layers located on one side of the array film layer 240 away from the display film layer 250 may refer to the above description, for example, the fixing adhesive layer 310 may also be arranged in the second support layer 220 and the substrate 230, and this will not be repeated in the embodiment of the present application.

The following is taking the fixing adhesive layer 310 located within the packaging film layer 260 as an example, to describe a solution in which the fixing adhesive layer 310 may be arranged in a non-display area of at least one film layer on a side of the substrate 230 away from the second support layer 220.

Figure 14:
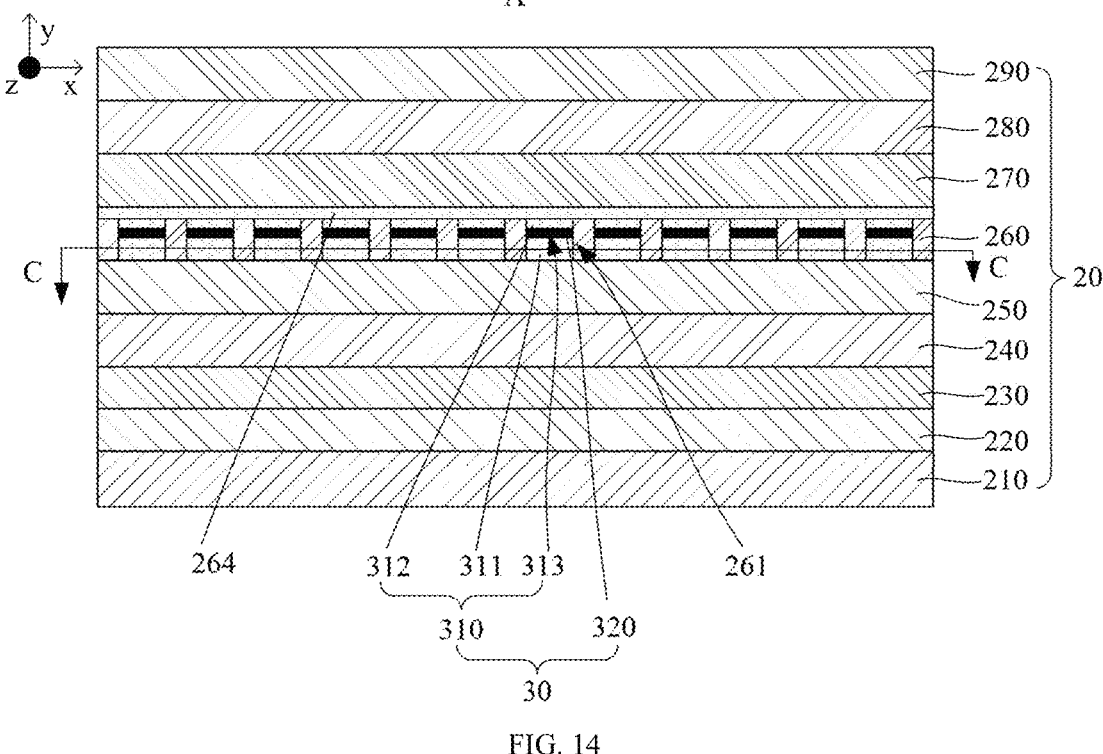
FIG. 14 is a schematic diagram of another cross-sectional structure at A of the flexible display panel shown in FIG. 1.

Referring to FIG. 14, a second receiving cavity 261 is arranged in the packaging film layer 260, and the magnetic powder 320 is located within the second receiving cavity 261. Exemplarily, referring to FIG. 15, the second receiving cavity 261 is located within a non-display area E. The magnetic powder 320 can prevent the display effect from being affected by blocking the light emitted by the packaging film layer 260. Exemplarily, the second receiving cavity 261 is located on both sides of the flexible display panel 20 along an axial direction of the reel 10, i.e., the second receiving cavity 261 is located on both sides of z direction as shown in FIG. 15.

Figure 15:
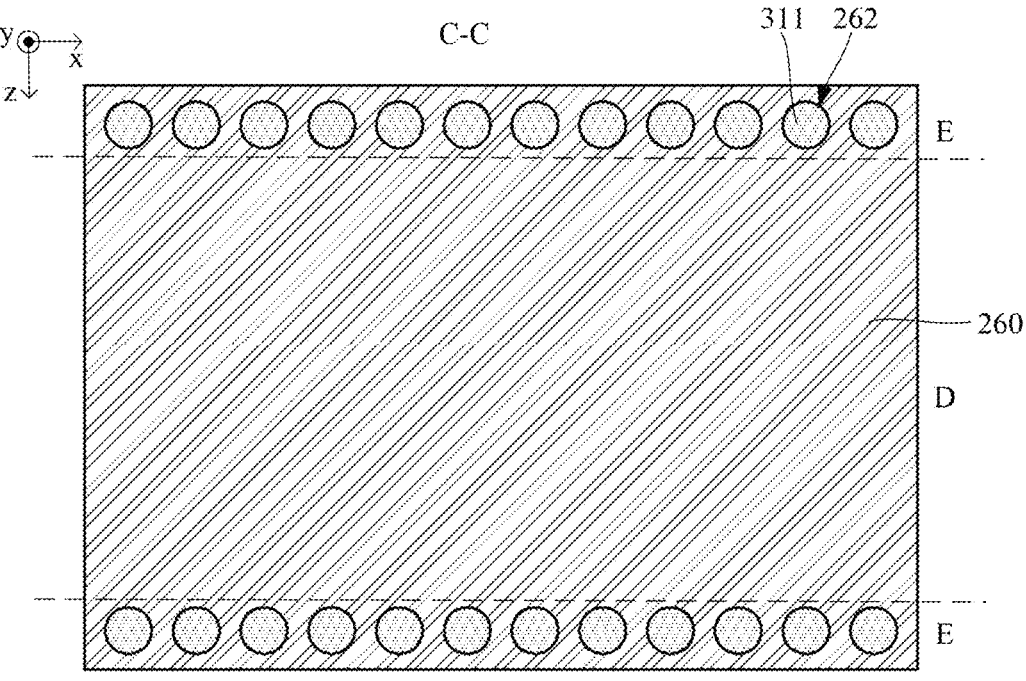
FIG. 15 is a cross-sectional view taken along a C-C direction shown in FIG. 14.

Referring to FIG. 15, the second receiving cavity 261 may be a second receiving hole 262, and the fixing adhesive layer 310 is filled in the second receiving hole 262. There may be a plurality of second receiving holes 262, the plurality of second receiving holes 262 are spaced apart in the packaging film layer 260, and the second receiving holes 262 are used to accommodate the fixing adhesive layer 310. Exemplarily, the plurality of second receiving holes 262 may be arranged in a matrix in the non-display area E of the packaging film layer 260, or the plurality of second receiving holes 262 may be randomly arranged in the non-display area E of the packaging film layer 260. The shapes of cross sections of the second receiving holes 262 in a direction parallel to the packaging film layer 260 may be circular, rectangular, triangular or the like.

Figure 16:
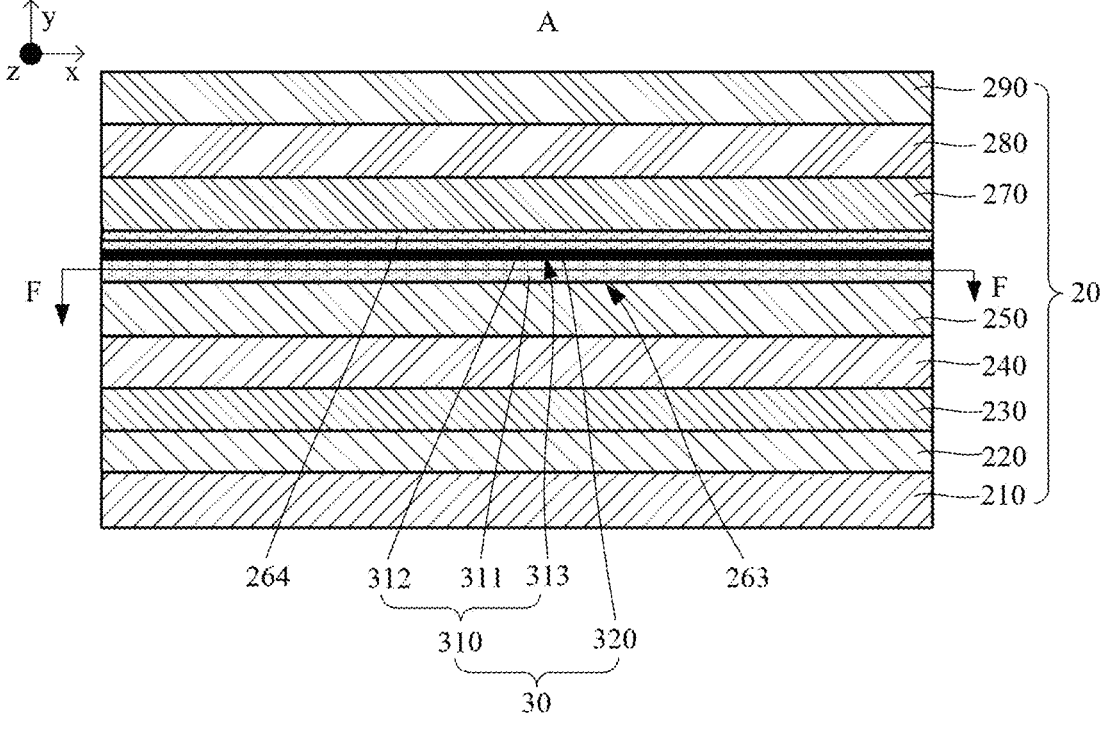
FIG. 16 is a schematic diagram of another cross-sectional structure at A of the flexible display panel shown in FIG. 1.
Figure 17:
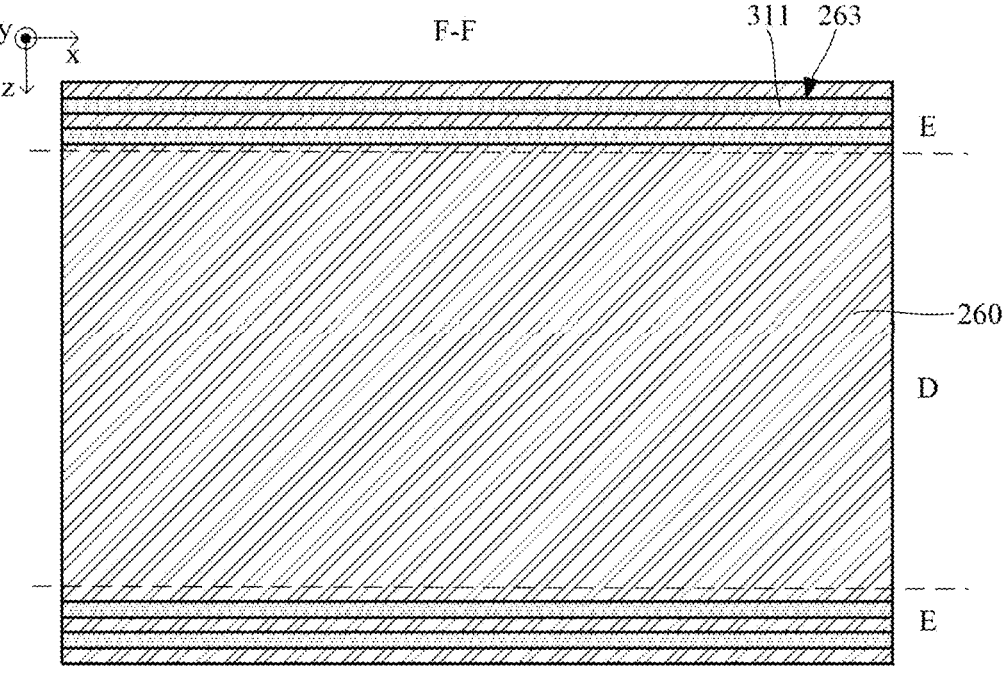
FIG. 17 is a cross-sectional view taken along an F-F direction shown in FIG. 16.

Exemplarily, referring to FIGS. 16 and 17, the second receiving cavity 261 may also be a second receiving groove 263, and the fixing adhesive layer 310 is filled in the second receiving groove 263. A length direction of the second receiving groove 263 is parallel to an extension direction of the non-display area E at both sides of the z direction, that is, the second receiving groove 263 extends in x direction shown in FIG. 16. There may be a plurality of second receiving grooves 263, the plurality of second receiving grooves 263 are parallel to each other and spaced apart, and the second receiving grooves 263 have a larger volume, which can increase the volume of the magnetic powder 320 that can be accommodated, thereby increasing an attraction force between the magnetic attraction part 30 and the reel 10 to further reduce a spacing between adjacent circles of flexible display panels 20.

Exemplarily, the fixing adhesive layer 310 may be provided with the accommodating cavity 313, and the magnetic powder 320 is located within the accommodating cavity 313. The fixing adhesive layer 310 may be filled in the second receiving cavity 261. In some implementations of the embodiment of the present application, a top surface of the fixing adhesive layer 310 and a side wall of the second receiving cavity 261 enclose to form the accommodating cavity 313. The magnetic powder 320 is located on the top surface of the fixing adhesive layer 310, and the top surface of the magnetic powder 320 may not be higher than the top surface of the first support layer 210.

In some other implementations of the embodiments of the present application, referring to FIG. 14, the fixing adhesive layer 310 may include a first adhesive layer 311 and a second adhesive layer 312 arranged opposite to each other, and the accommodating cavity 313 is formed between the first adhesive layer 311 and the second adhesive layer 312.

Exemplarily, the first adhesive layer 311 is filled in the second receiving cavity 261. Taking an orientation shown in FIG. 14 as an example, the second adhesive layer 312 is located above the first adhesive layer 311 and is filled in the second receiving cavity 261, there is a spacing between a bottom surface of the second adhesive layer 312 and a top surface of the first adhesive layer 311, the spacing and a side wall of the second receiving cavity 261 enclose to form the accommodating cavity 313, and the magnetic powder 320 is located within the accommodating cavity 313.

The present application further provides an embodiment, which is different from other embodiments in that a connecting adhesive layer may be provided between the magnetic attraction part 30 and a film layer adjacent to the magnetic attraction part 30 so as to bond the film layer provided with the magnetic attraction part 30 to a film layer adjacent to the film layer. Exemplarily, referring to FIGS. 14 and 16, the magnetic attraction part 30 is arranged in the packaging film layer 260, a touch layer 270 is adjacent to the packaging film layer 260, and there is a connecting adhesive layer between the touch layer 270 and the packaging film layer 260, the connecting adhesive layer includes a second connecting adhesive layer 264, and the fixing adhesive layer 310 and the second connecting adhesive layer 264 may be integrated. The second connecting adhesive layer 264 is used for connecting the packaging film layer 260 and the touch layer 270. Since the second connecting adhesive layer 264 and the second adhesive layer 312 are an integrated structure, when the second connecting adhesive layer 264 is formed, the second adhesive layer 312 of the fixing adhesive layer 310 can be formed at the same time, which can reduce the process steps of the flexible display panel 20 and improve the production efficiency of the flexible display panel 20.

It can be understood that a solution in which the fixing adhesive layer 310 is located within other film layer of film layers on a side of the substrate 230 away from the second support layer 220 may refer to the above description, for example, the fixing adhesive layer 310 may be arranged in the array film layer 240, the display film layer 250, the touch layer 270, the polarizing layer 280 and the cover layer 290, and this will not be repeated in the embodiment of the present application.

The magnetic attraction part 30 may also be located between any two adjacent film layers in the flexible display panel 20, and the fixing adhesive layer 310 is bonded to any two adjacent film layers. Exemplarily, the magnetic attraction part 30 may be located between any two adjacent film layers in the film layers on a side of the display film layer 250 away from the packaging film layer 260. Exemplarily, the magnetic attraction part 30 may also be located between any two adjacent film layers in the film layers on a side of the array film layer 240 away from the substrate 230.

The following is taking the fixing adhesive layer 310 located between the first support layer 210 and the second support layer 220 as an example, to describe a solution in which the magnetic attraction part 30 may be arranged between any two adjacent film layers of the film layers on a side of the display film layer 250 away from the packaging film layer 260, and the fixing adhesive layer 310 is bonded to any two adjacent film layers.

Figure 18:
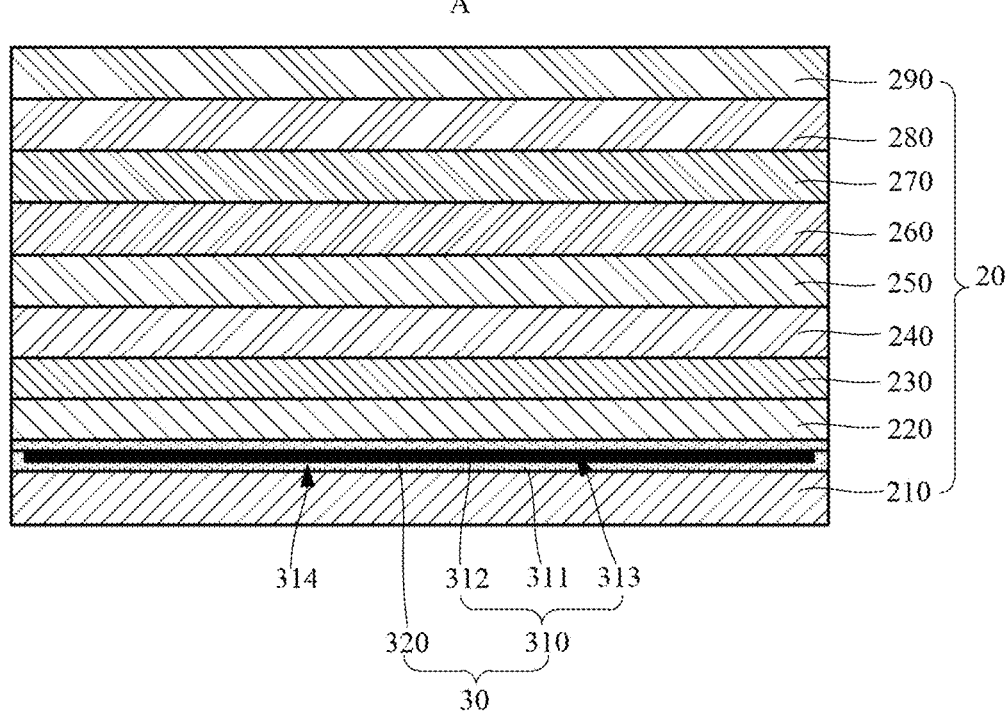
FIG. 18 is a schematic diagram of another cross-sectional structure at A of the flexible display panel shown in FIG. 1.

Exemplarily, referring to FIG. 18, the fixing adhesive layer 310 is located between the first support layer 210 and the second support layer 220 and is bonded to the first support layer 210 and the second support layer 220. The fixing adhesive layer 310 can not only fix the magnetic powder 320, but also play a role of bonding the first support layer 210 and the second support layer 220 so as to simplify the structure of the flexible display panel 20.

Referring to FIG. 18, the fixing adhesive layer 310 may include a first adhesive layer 311 and a second adhesive layer 312 arranged opposite to each other, the accommodating cavity 313 is formed between the first adhesive layer 311 and the second adhesive layer 312, and the magnetic powder 320 is located within the accommodating cavity 313. Exemplarily, a side of the first adhesive layer 311 facing the second adhesive layer 312 may be provided with a groove 314, the groove 314 and a side surface of the second adhesive layer 312 enclose to form the accommodating cavity 313, the magnetic powder 320 is located within the accommodating cavity 313, the second adhesive layer 312 and the first adhesive layer 311 can be bonded to fix the magnetic powder 320 in the accommodating cavity 313.

Figure 19:
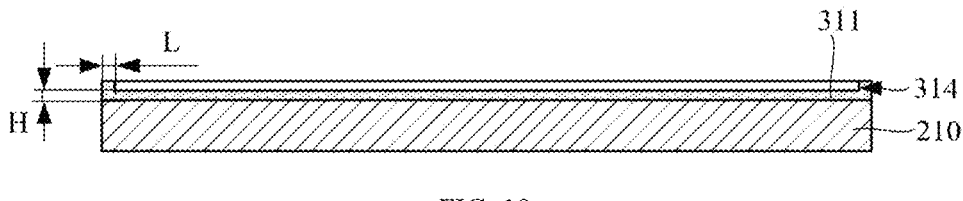
FIG. 19 is a schematic diagram of formation of a first adhesive layer and a first receiving cavity on a first support layer when forming the flexible display panel shown in FIG. 18.
Figure 20:
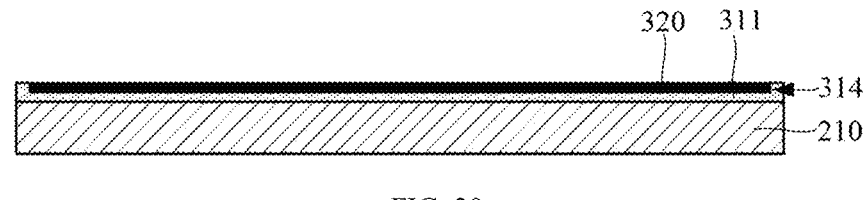
FIG. 20 is a schematic diagram of the first receiving cavity shown in FIG. 19 filled with magnetic powders.
Figure 21:
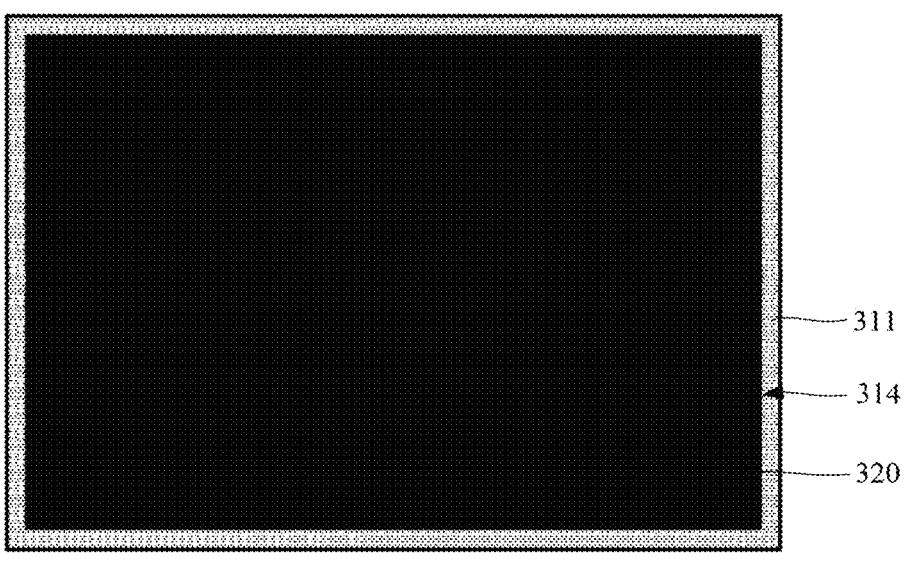
FIG. 21 is a top view of FIG. 20.
Figure 22:
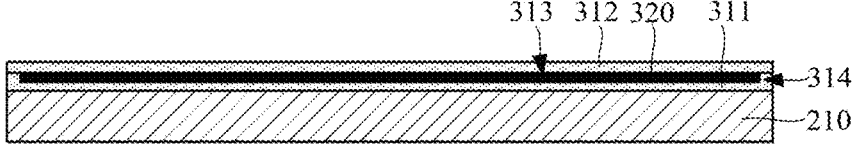
FIG. 22 is a schematic diagram of formation of a second adhesive layer on the first adhesive layer shown in FIG. 20.
Figure 23:
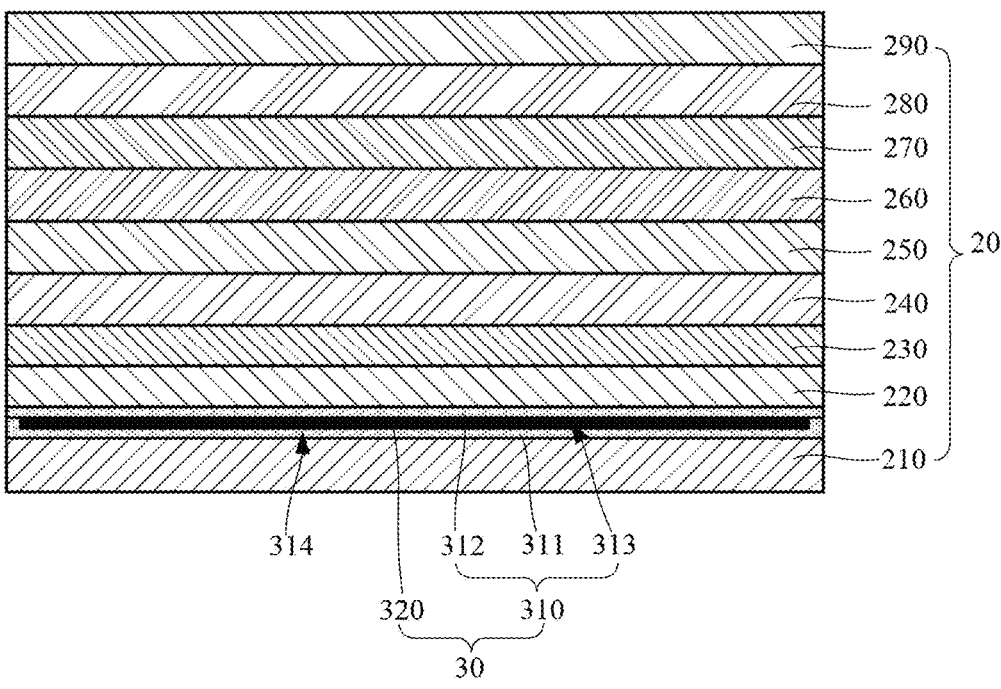
FIG. 23 is a schematic diagram of formation of other layers of a flexible display panel on the second adhesive layer shown in FIG. 22.

When the magnetic attraction part 30 is arranged on the first support layer 210 and the second support layer 220, referring to FIG. 19, the first adhesive layer 311 may be formed on the first support layer 210, for example, the first adhesive layer 311 may be formed by coating, and a groove 314 may be formed on the first adhesive layer 311. Taking an orientation shown in FIG. 19 as an example, a distance between an inner wall of the groove 314 and an outer wall of the first adhesive layer 311 is L, and a distance between a top surface of the first adhesive layer 311 and a bottom surface of the groove 314 is H. Referring to FIGS. 20 and 21, the magnetic powder 320 is formed in the groove 314, and the magnetic powder 320 may fully fill the groove 314. Referring to FIG. 22, the second adhesive layer 312 is formed on the first adhesive layer 311 and the magnetic powder 320, the second adhesive layer 312 covers the magnetic powder 320 and fits with an upper surface of the first adhesive layer 311, the groove 314 and part of the second adhesive layer 312 corresponding to the groove 314 enclose to form the accommodating cavity 313 to fix the magnetic powder 320 in the accommodating cavity 313. Exemplarily, the first adhesive layer 311 and the second adhesive layer 312 may be a pressure-sensitive adhesive. Referring to FIG. 23, other film layers of the flexible display panel 20 may be formed on the second adhesive layer 312 after forming the second adhesive layer 312.

Exemplarily, referring to FIG. 21, there may be one groove 314, the one groove 314 is formed on the first adhesive layer 311, and an area of a projected of an inner wall of the one groove 314 may be slightly smaller than an area of a top surface of the first adhesive layer 311, so that the magnetic powder 320 can be spread on an entire surface of the first adhesive layer 311 to increase the attraction force between the magnetic attraction part 30 and the reel 10, and to further reduce the spacing between adjacent circles of flexible display panels 20; in addition, the consistency of the attraction force between the flexible display panel 20 and the reel 10 can be improved when the flexible display panel 20 is rolled up onto the reel 10, thereby ensuring consistency of the spacing between adjacent circles of flexible display panels 20, preventing stress concentration due to the sudden change of the shape of the flexible display panel 20, preventing the flexible display panel 20 from cracks and the inner film layers of the flexible display panel 20 from separation, thereby ensuring the display effect of the flexible display module.

Exemplarily, there may be also a plurality of grooves 314 and the grooves 314 are arranged in parallel and spaced apart on the first adhesive layer 311. A length direction of the grooves 314 may be along an axial direction of the reel 10 or a radial direction of the reel 10, and this will not be repeated in the embodiment of the present application.

Figure 24:
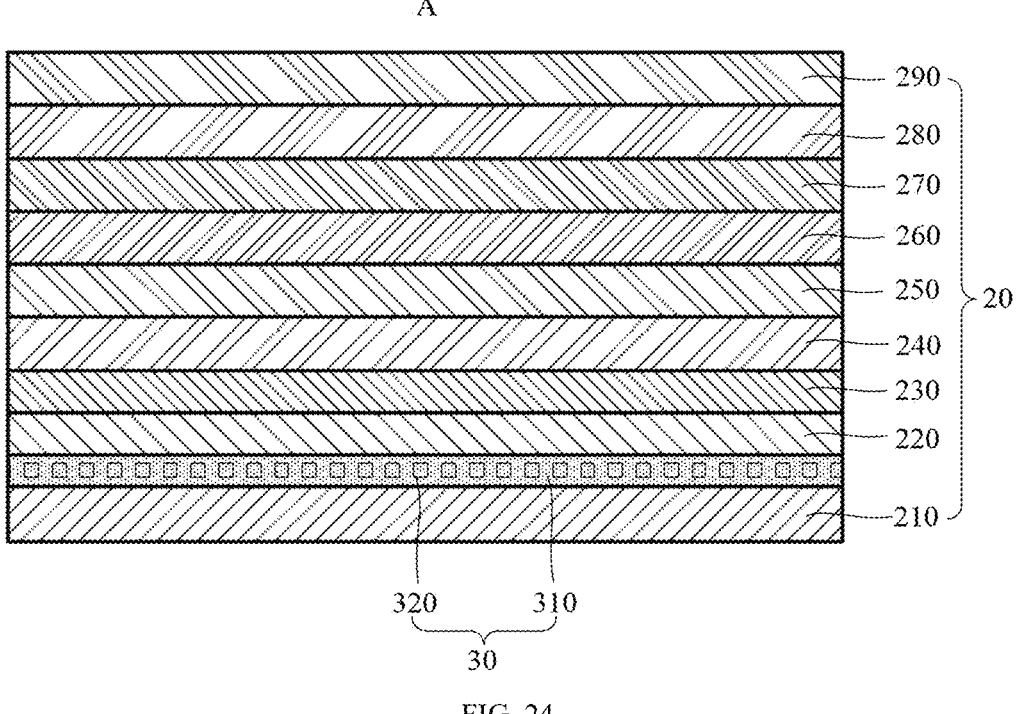
FIG. 24 is a schematic diagram of another cross-sectional structure at A of the flexible display panel shown in FIG. 1.

Exemplarily, referring to FIG. 24, the magnetic powder 320 may be mixed in the fixing adhesive layer 310, the fixing adhesive layer 310 mixed with the magnetic powder 320 is located between the first support layer 210 and the second support layer 220, and the first support layer 210 and the second support layer 220 are bonded by the fixing adhesive layer 310.

It can be understood that a solution in which the fixing adhesive layer 310 is arranged between any two adjacent other film layers of the film layers on a side of the display film layer 250 away from the packaging film layer 260 may refer to the above description, for example, the fixing adhesive layer 310 may be arranged between the second support layer 220 and the substrate 230, between the substrate 230 and the array film layer 240, and between the array film layer 240 and the display film layer 250, and this will not be repeated in the embodiment of the present application.

The following is taking the fixing adhesive layer 310 located between the display film layer 250 and the packaging film layer 260 as an example, to describe a solution in which the magnetic attraction part 30 may be arranged between the array film layer 240 and any two adjacent film layers of the film layers located on a side of the array film layer 240 away from the substrate 230, and the fixing adhesive layer 310 is bonded to any two adjacent film layers.

Figure 25:
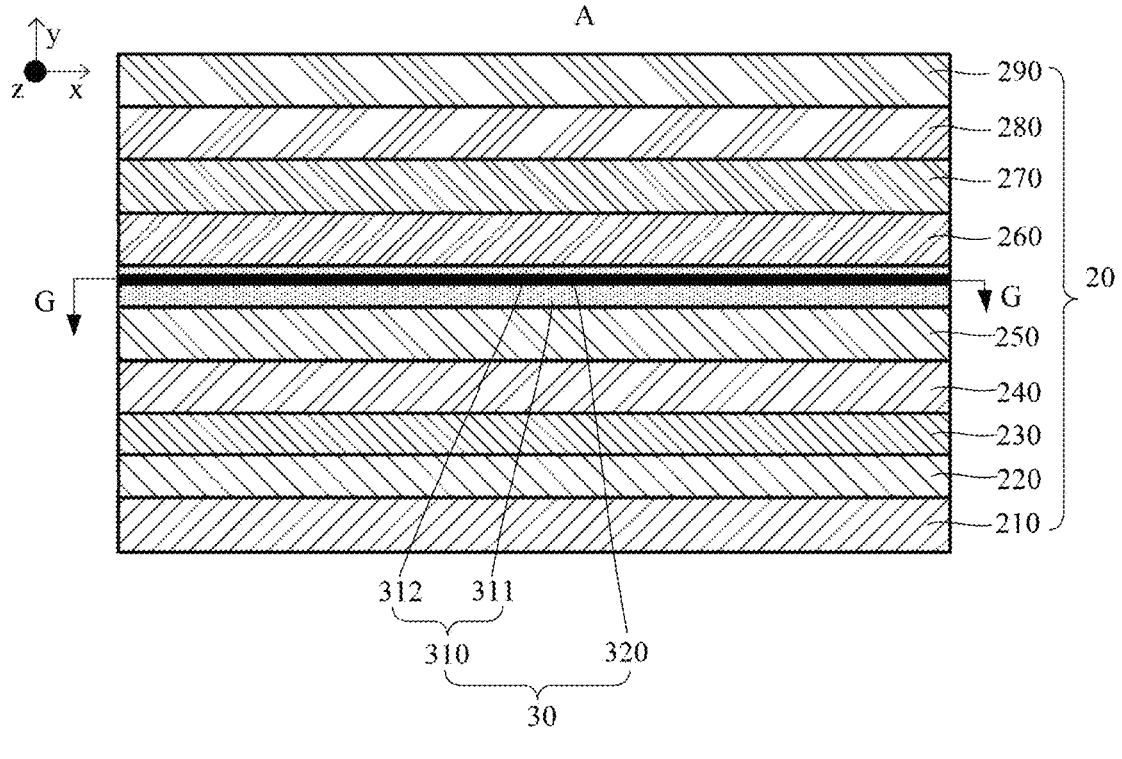
FIG. 25 is a schematic diagram of another cross-sectional structure at A of the flexible display panel shown in FIG. 1.

Referring to FIG. 25, the fixing adhesive layer 310 is located between the display film layer 250 and the packaging film layer 260 and is bonded to the display film layer 250 and the packaging film layer 260. The fixing adhesive layer 310 can not only fix the magnetic powder 320, but also play a role of bonding the display film layer 250 and packaging film layer 260 to simplify the structure of the flexible display panel 20. The magnetic powder 320 is located within the non-display area E to prevent the display effect from being affected by blocking the light emitted by the display film layer 250. Exemplarily, referring to FIG. 25, the magnetic powder 320 is located on both sides of the flexible display panel 20 along the axial direction of the reel 10, i.e., both sides of z direction shown in FIG. 25. Exemplarily, the fixing adhesive layer 310 may also be located within the non-display area E.

Referring to FIG. 25, the fixing adhesive layer 310 may include the first adhesive layer 311 and the second adhesive layer 312 both of which are fitted with each other along their entire edges, and the accommodating cavity 313 is formed in a portion between the first adhesive layer 311 and the second adhesive layer 312 other than a part where the first adhesive layer 311 and the second adhesive layer 312 are fitted with each other, and the magnetic powder 320 is located within the accommodating cavity 313. Exemplarily, referring to FIG. 26, a non-display area on a side of the first adhesive layer 311 facing the second adhesive layer 312 may be provided with the groove 314, the groove 314 and part of the second adhesive layer 312 corresponding to the groove 314 enclose to form the accommodating cavity 313, the magnetic powder 320 is located within the accommodating cavity 313, and the second adhesive layer 312 is bonded to the first adhesive layer 311 to fix the magnetic powder 320 in the accommodating cavity 313.

Figure 26:
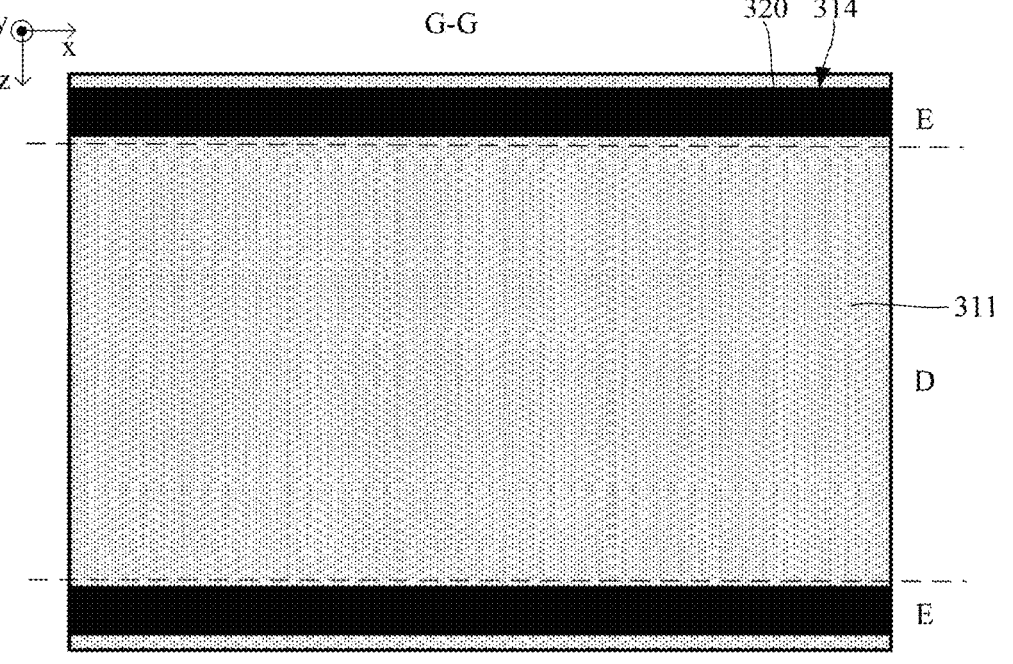
FIG. 26 is a cross-sectional view taken along a G-G direction shown in FIG. 25.

Exemplarily, referring to FIG. 26, there may be two grooves 314, and the two grooves 314 may be symmetrically arranged in the non-display area E on both sides of the first adhesive layer 311 in the z direction. A length direction of the two grooves 314 may be parallel to an extension direction of the non-display area E on both sides of the first adhesive layer 311 in the z direction, that is, the two grooves 314 extend in the x direction. There may be a plurality of grooves 314, the plurality of grooves 314 arranged in parallel and spaced apart in the non-display area E of the first adhesive layer 311. Exemplarily, the magnetic powder 320 may also be mixed in part of the fixing adhesive layer 310 located within the non-display area E, and the fixing adhesive layer 310 mixed with the magnetic powder 320 is located between the display film layer 250 and the packaging film layer 260, and the display film layer 250 and the packaging film layer 260 are bonded by the fixing adhesive layer 310.

For example, the fixing adhesive layer 310 may also be located between the packaging film layer 260 and the touch layer 270 and bonded to the packaging film layer 260 and the touch layer 270. The fixing adhesive layer 310 can not only fix the magnetic powder 320, but also play a role of bonding the display film layer 250 and packaging film layer 260 to simplify the structure of the flexible display panel 20. The magnetic powder 320 is located within the non-display area E to prevent the display effect from being affected by blocking the light emitted by the display film layer 250 through the packaging film layer 260.

It can be understood that a solution in which the fixing adhesive layer 310 is arranged between any two adjacent other film layers of film layers on a side of the array film layer 240 away from the substrate 230 may refer to the above description, for example, the fixing adhesive layer 310 may be located between the touch layer 270 and the polarizing layer 280, and between the polarizing layer 280 and the cover layer 290, and this will not be repeated in the embodiment of the present application.

An embodiment of the present application further provides a flexible display device, including any one of the flexible display modules above. Since the flexible display device of the embodiment of the present application includes the flexible display module, the flexible display device also has the advantages of the flexible display module, and this will not be repeated here.

What is claimed is:

1. A flexible display module, comprising:
a magnetic reel;
a flexible display panel that is rollable around the reel, wherein the flexible display panel comprises a magnetic attraction part that is configured to be attracted by the reel when the flexible display panel is rolled up onto the reel;
wherein the magnetic attraction part comprises a magnetic powder and a fixing adhesive layer for fixing the magnetic powder; and
the fixing adhesive layer is provided with an accommodating cavity and the magnetic powder is located in the accommodating cavity;
wherein the flexible display panel further comprises a plurality of film layers in a laminated arrangement, at least one film layer comprises a receiving cavity, the receiving cavity is a receiving hole or a receiving groove, the magnetic attraction part is filled in the receiving hole or the receiving groove, and the receiving cavity comprises a first receiving cavity;
wherein a top surface of the fixing adhesive layer and a side wall of the first receiving cavity enclose to form the accommodating cavity, the magnetic powder is located on the top surface of the fixing adhesive layer, and a top surface of the magnetic powder is not higher than a top surface of the first support layer.

2. The flexible display module according to claim 1, wherein the reel is an electromagnetic reel and, when the flexible display panel is rolled up onto the electromagnetic reel, the electromagnetic reel is magnetic when energized.

3. The flexible display module according to claim 1, wherein the fixing adhesive layer comprises a first adhesive layer and a second adhesive layer arranged opposite to each other, and the accommodating cavity is formed between the first adhesive layer and the second adhesive layer; and
a groove is arranged on a side of the first adhesive layer towards the second adhesive layer, and the groove is enclosed by the second adhesive layer to form the accommodating cavity.

4. The flexible display module according to claim 1, wherein the magnetic powder is mixed in the fixing adhesive layer.

5. The flexible display module according to claim 1, wherein the plurality of film layers comprises a first support layer, a second support layer, a substrate, an array film layer, a display film layer, and a packaging film layer.

6. The flexible display module according to claim 5, wherein a connecting adhesive layer is arranged between the magnetic attraction part and a film layer adjacent to the magnetic attraction part.

7. The flexible display module according to claim 6, wherein the connecting adhesive layer and the fixing adhesive layer are integrated.

8. The flexible display module according to claim 5, wherein the magnetic attraction part is arranged in at least one film layer of the flexible display panel.

9. The flexible display module according to claim 8, wherein the fixing adhesive layer is located within the receiving cavity.

10. The flexible display module according to claim 9, wherein at least one of film layers on a side of the array film layer away from the display film layer is provided with the first receiving cavity.

11. The flexible display module according to claim 10, wherein the first receiving cavity extends along an axial direction of the reel.

12. The flexible display module according to claim 9, wherein the receiving cavity further comprises a second receiving cavity, and a non-display area of at least one of film layers on a side of the substrate away from the second support layer is provided with the second receiving cavity.

13. The flexible display module according to claim 12, wherein the second receiving cavity is located on both sides of the flexible display panel along an axial direction of the reel.

14. The flexible display module according to claim 5, wherein the magnetic attraction part is located between any two adjacent film layers in the flexible display panel, and the fixing adhesive layer is bonded with the any two adjacent film layers.

15. The flexible display module according to claim 5, wherein the magnetic attraction part is located between any two adjacent film layers in the film layers on a side of the display film layer away from the packaging film layer; and/or
the magnetic attraction part is located between any two adjacent film layers in the film layers on a side of the array film layer away from the substrate.

16. The flexible display module according to claim 15, wherein the magnetic powder is located on both sides of the flexible display panel along an axial direction of the reel, and the fixing adhesive layer in a non-display area.

17. A flexible display device, comprising the flexible display module according to claim 1.

18. The flexible display module according to claim 1, wherein the receiving cavity comprises a plurality of first receiving holes, and the plurality of first receiving holes are all arranged in the first support layer.

19. The flexible display module according to claim 1, wherein the receiving cavity comprises a plurality of first receiving grooves, and the plurality of first receiving grooves are arranged in parallel and spaced apart.

\* \* \* \* \*